US008241413B2

(12) United States Patent
Dirnberger

(10) Patent No.: US 8,241,413 B2
(45) Date of Patent: Aug. 14, 2012

(54) AIR FILTER SYSTEM OF A MOTOR VEHICLE

(75) Inventor: Timo Dirnberger, Marbach (DE)

(73) Assignee: Mann+Hummel GmbH, Ludwigsburg (DE)

( * ) Notice: Subject to any disclaimer, the term of this patent is extended or adjusted under 35 U.S.C. 154(b) by 381 days.

(21) Appl. No.: 12/507,882

(22) Filed: Jul. 23, 2009

(65) Prior Publication Data

US 2010/0018400 A1 Jan. 28, 2010

(30) Foreign Application Priority Data

Jul. 25, 2008 (DE) ..................... 20 2008 010 058 U

(51) Int. Cl.
*B01D 46/46* (2006.01)

(52) U.S. Cl. .............................. 96/422; 95/23; 55/385.3

(58) Field of Classification Search ............ 55/522–524, 55/385.3; 422/169–172, 177–182; 60/297; 96/422; 95/23
See application file for complete search history.

(56) References Cited

U.S. PATENT DOCUMENTS

| | | | | |
|---|---|---|---|---|
| 5,546,794 | A * | 8/1996 | Kuhn et al. | 73/114.34 |
| 5,803,608 | A * | 9/1998 | Randoll et al. | 374/144 |
| 6,101,869 | A | 8/2000 | Kadohiro et al. | |
| 6,185,998 | B1 * | 2/2001 | Yonezawa et al. | 73/114.34 |
| 6,272,920 | B1 * | 8/2001 | Tank et al. | 73/204.22 |
| 6,355,076 | B2 * | 3/2002 | Gieseke et al. | 55/330 |
| 6,363,779 | B1 * | 4/2002 | Hochenberger et al. | 73/114.37 |
| 6,619,114 | B1 * | 9/2003 | Lenzing et al. | 73/202.5 |
| 2002/0088214 | A1 * | 7/2002 | Sherwood | 55/486 |
| 2004/0105792 | A1 * | 6/2004 | Worner et al. | 422/180 |
| 2005/0022382 | A1 * | 2/2005 | Bruck et al. | 29/890 |
| 2005/0170957 | A1 * | 8/2005 | Maus et al. | 502/439 |
| 2005/0235615 | A1 * | 10/2005 | Nyman et al. | 55/350.1 |
| 2005/0268788 | A1 * | 12/2005 | Kaiser | 96/417 |
| 2006/0021333 | A1 * | 2/2006 | Thaler | 60/295 |
| 2007/0266686 | A1 * | 11/2007 | Bruck | 55/523 |
| 2008/0170972 | A1 * | 7/2008 | Cai et al. | 422/177 |
| 2011/0011067 | A1 * | 1/2011 | Ren et al. | 60/297 |

FOREIGN PATENT DOCUMENTS

DE 102005055479 A1 5/2007

(Continued)

OTHER PUBLICATIONS

Papsch, English translation of DE 102005055479—Air intake filter housing for internal combustion engine includes outlet stub pope attachd by two integral clip arrangements formed during injection molding, foreign publication date May 31, 2007, English translation date Oct. 11, 2011, Germany.*

(Continued)

*Primary Examiner* — Duane Smith
*Assistant Examiner* — Amber Orlando
(74) *Attorney, Agent, or Firm* — James Hasselbeck

(57) ABSTRACT

An air filter system of a motor vehicle has an air filter housing with a housing part of a moisture-sensitive plastic material and an air passage section with a circumferentially extending passage wall, wherein the passage wall of the air passage section is integrally formed of identical material on the housing part of the air filter housing. A mass air flow sensor is arranged in the air passage section. A plastic insert of a moisture-insensitive plastic material is disposed on an inner side of the passage wall of the air passage section and lines the passage wall.

13 Claims, 2 Drawing Sheets

FOREIGN PATENT DOCUMENTS

| | | |
|---|---|---|
| EP | 1052489 | 11/2000 |
| EP | 1193389 | 4/2002 |

OTHER PUBLICATIONS http://www.azom.com/article.aspx?ArticleID=1998, Polybutylene Terephthalate (PBT)—Properties and Applications—Supplier Data by Goodfellow, May 23, 2003, Goodfellow.* http://www.kern-gmbh.de/cgi-bin/riweta.cgi?nr=1324&Ing=2, polybutylene terephthalate with 30% glass fibre flame-retardant (PBT GF30 V0), Sep. 4, 2004, Kern GmbH.*

German patent office search report of priority application DE202008010058.5.

EP Search report for related application: EP 09165938, dated Oct. 24, 2009.

* cited by examiner

AIR FILTER SYSTEM OF A MOTOR VEHICLE

CROSS REFERENCE TO RELATED APPLICATIONS

This application claims the benefit under 35 USC 119 of the filing date of foreign application DE 20 2008 010 058.5 filed in the Federal Republic of Germany on Jul. 25, 2008, the entire disclosure of which is incorporated herein by reference.

TECHNICAL FIELD

This disclosure relates to an air filter system of a motor vehicle.

BACKGROUND OF THE INVENTION

The invention relates an air filter system of a motor vehicle, comprising an air filter housing with a housing part of moisture-sensitive plastic material and an air passage section with a circumferentially extending passage wall, wherein the passage wall of the air passage section is integrally formed of identical material on the housing part of the air filter housing and wherein a mass air flow sensor is arranged in the air passage section.

Internal combustion engines of a motor vehicle comprise an electronic control unit in particular for metering the fuel quantity to be injected. This control unit operates with the aid of various sensors for determining the operating parameters. An important sensor in this connection is the mass air flow sensor that is embodied in particular as a hot-film mass air flow sensor (HF MAF). The mass air flow sensor is arranged in the air intake passage and supplies the engine control unit with data in regard to the actually drawn in mass air flow. A preferred attachment location for the mass air flow sensor is the filtered air side of the air filter housing where the sensitive mass air flow sensor is exposed to a filtered intake air flow. Known HF MAF sensors however are not only sensitive with regard to soiling but, for providing precise measuring results, require also a laminar and turbulence-free flow that moreover must be precisely defined with regard to its geometric course.

For ensuring a good measuring result, configurations of the HF MAF sensor are known that provide the sensor with its own housing that is inserted into the air filter housing. Such configurations however incur comparatively high costs. Moreover, the interface of HF MAF sensor housing and air filter housing causes a reduction of the free flow cross-section so that an undesirably increased pressure loss in the intake air flow is observed.

For avoiding the above disadvantages an alternative configuration is known where in particular a housing part of the air filter housing at the filtered air side is provided with an integrally formed air passage section of material identical to that of the housing part wherein in this air passage section the mass air flow sensor is arranged and extends through the passage wall of the air passage section. Such mass air flow sensors that are also referred to as plug-in HF MAF sensors do not have their own housing. There is no cross-sectional loss as a result of the interface to the air filter housing so that the pressure loss in the intake air flow is reduced. Also, the costs of the arrangement are reduced.

However, in this connection several difficulties have to be overcome. The air filter housing including the integrally formed air passage section of identical material is typically produced of a plastic material such as polyamide or the like. In this connection, in addition to the unavoidable thermal dimensional changes also moisture-caused dimensional changes occur because polyamide, as a moisture-sensitive plastic material, has the tendency to absorb moisture. The moisture-caused dimensional changes of the air passage section supporting the mass air flow sensor cannot be compensated easily. As a result, moisture-caused dimensional changes of the air passage section affect the geometric flow course and thus cause measuring errors or measuring imprecisions. A possibly required flow guiding grid that is provided for calming the flow or for causing laminar flow of the intake air flow and that contributes therefore to measuring precision must be manufactured and mounted as a separate component; this is not optimal with regard to costs and also generates additional dimensional tolerances.

It is therefore an object of the present invention to improve an air filter system of the aforementioned kind in such a way that an increased measuring precision of the mass air flow sensor is provided.

SUMMARY OF THE INVENTION

In accordance with the present invention, this is achieved in that the passage wall of the air passage section is lined at the inner side with a plastic insert of a moisture-insensitive plastic material.

An air filter system of a motor vehicle is proposed that comprises an air filter housing with a housing part of moisture-sensitive plastic material, in particular polyamide, and an air passage section with a circumferentially extending passage wall. The passage wall of the air passage section is integrally formed of identical material on the housing part of the air filter housing wherein in the air passage section a mass air flow sensor is arranged. The passage wall of the air passage section is lined on the inner side by means of a plastic insert of plastic material that is insensitive to moisture. The moisture-insensitive plastic material is comprised advantageously at least primarily of polybutylene terephthalate (PBT) and is preferably fiberglass-reinforced PBT, in particular PBT GF30 (PBT containing 30% fiberglass).

In deviation from the known configuration of a HF MAF sensor with a housing, the integrally formed same-material molding of the circumferentially extending passage wall on the housing part of the air filter housing, which passage wall forms the air passage section, has the result that no cross-sectional losses are produced by an otherwise existing interface to the air filter housing so that the desired minimal pressure loss in the intake air flow is achieved. Also, the disadvantages of the known configuration with a plug-in HF MAF sensor without its own housing are eliminated: The housing part of the air filter housing can still be produced from a suitable plastic material such as polyamide (PA). The moisture-sensitivity observed in connection with this plastic material in the form of water absorption and resulting dimensional changes no longer has a disadvantageous effect on the measuring precision of the mass air flow sensor arranged in the air passage section. Instead, the lining at the inner side of the passage wall of the air passage section by means of the plastic insert of moisture-insensitive plastic material provides for dimensional stability of the passage cross-section and thus of the geometric flow course that is, at least in approximation, independent of the moisture of the ambient air and of the intake air flow. Moisture effects on the flow course of the intake air flow and thus on the measuring result of the mass air flow sensor are thus almost completely prevented. In comparison to an insert in the form of a sheet metal part that is punch-riveted, a smooth aerodynamically shaped and interference-free surface can be produced because of the elimination of rivets, abutting edges or the like which surface is beneficial for obtaining a laminar flow about the mass air flow sensor and thus contributes to improving the measuring precision. As a whole, a significantly increased measuring precision is produced that is beneficial for a more precise motor control action.

The preferred material pairing of PA for the housing part of the filter housing and PBT for the plastic insert is based on the excellent material compatibility of both plastic materials because PA and PBT have similar thermal expansion coefficients. The very minimal water absorption of PBT however eliminates at least in approximation the moisture effect on dimensional changes of the passage cross-section and thus on the geometric flow course of the intake air flow.

It can be expedient to introduce the plastic insert, for example, by means of a two-component injection molding process, into the air passage section. In a preferred embodiment, the plastic insert is inserted into the air passage section and in particular locked in place therein. Manufacturing and mounting expenditures are minimized. The insertion and also the locking action, on the one hand, produce a precise positional fixation of the plastic insert while, one on the other hand, there exists no intimate material connection between the two components. Moisture-caused dimensional changes of the passage wall of the air passage section are not forced onto the plastic insert.

In a preferred embodiment, an air guiding grid is formed integrally with the plastic insert. In particular, the plastic insert is injection-molded. The integral (monolithic) configuration of the air guiding grid with the plastic insert generates not only a reduction of the number of individual parts and thus a reduction of the mounting expenditure; in addition, the positional tolerances of the individual parts relative to one another are improved so that the measuring precision is improved also. In comparison to e.g. a metallic component, the manufacture of the plastic insert by an injection-molding method increases in addition to the dimensional precision also the degrees of freedom with regard to shaping. For example, an aerodynamically rounded intake area can be integrally formed that contributes to a laminar flow and thus is beneficial also in regard to measuring precision of the mass air flow sensor.

In an expedient embodiment of the invention the mass air flow sensor and the plastic insert form an integral component. The mass air flow sensor is calibrated in the integrated state, i.e., together with the plastic insert. Mounting and manufacturing tolerances can be eliminated by calibration based on measuring technology. A greater measuring precision is provided that is maintained after installation of the integrated component in the air filter system.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
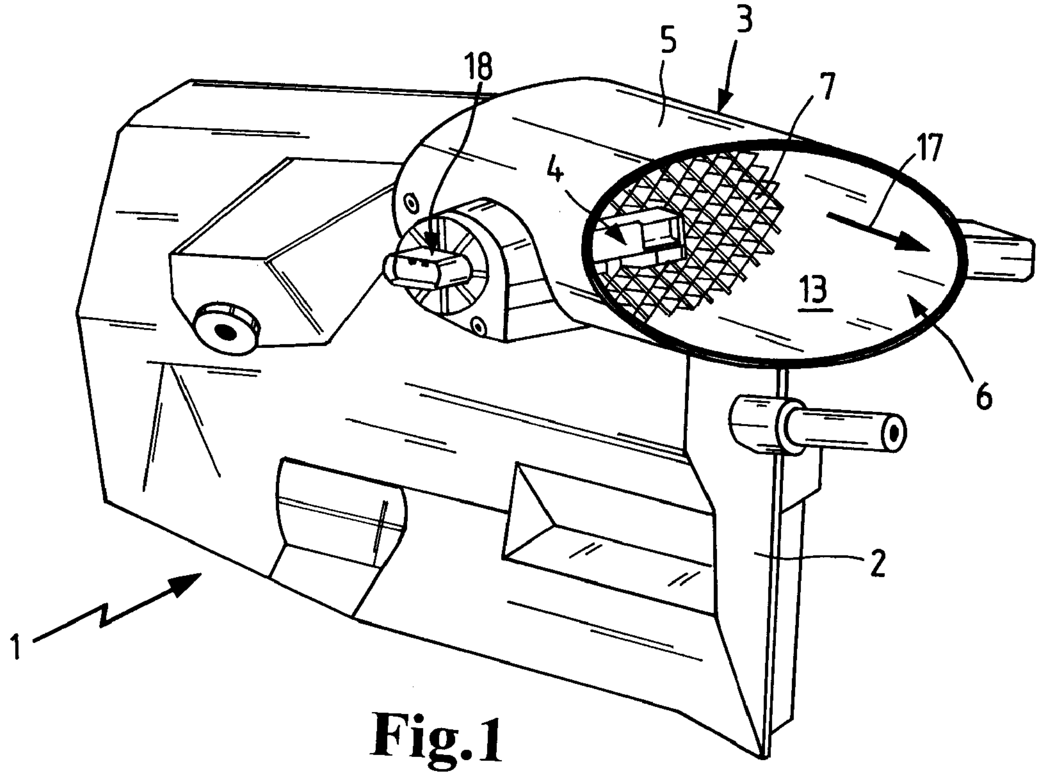
FIG. 1 is a perspective detail illustration of an air filter housing with integrally formed elliptical air passage section, a radially inserted mass air flow sensor, and a plastic insert of PBT inserted into the air passage section.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an air filter system for a motor vehicle as disclosed herein. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows in a perspective detail illustration a part of an air filter system of a drive motor of a motor vehicle. The air filter system is provided for supplying the drive motor with combustion air and comprises an air filter housing 1 in which an air filter, not illustrated in the drawing, is arranged for filtration of the combustion air flow. On its filtered air side the air filter housing 1 has a housing part 2 which is injection-molded of a moisture-sensitive plastic material, in this embodiment polyamide (PA). An air passage section 3 of the intake air passage extends away from the air filter housing 1 at the filtered air side, wherein a circumferentially extending passage wall 5 of the air filter passage section 3 that provides a flow guiding action is formed integrally and of the same material on the housing part 2 of the air filter housing 1. The circumferentially extending passage wall 5 and the housing part 2 are thus comprised of the same plastic material, in this embodiment of PA.

In the interior of the air passage section 3 there is an air guiding grid 7 and downstream thereof a mass air flow sensor 4 wherein the mass air flow sensor 4 in the illustrated embodiment is configured as a hot-film mass air flow sensor (HF MAF). Other configurations of the mass air flow sensor 4 can also be expedient. The flow cross-section of the air passage section 3 is elliptical and remains constant with regard to the flow direction indicated by arrow 17 in the area of the mass air flow sensor 4. However, a cross-sectional course that narrows in the flow direction can also be expedient as it causes in the area of the mass air flow sensor 4 an acceleration and thus an improved laminar flow. Also, the air guiding grid 7 contributes to a laminar flow configuration and thus to measuring precision of the mass air flow sensor 4 arranged downstream thereof.

The passage wall 5 of the air passage section 3 in the area of the mass air flow sensor 4 is lined on the inner side with a plastic insert 6 of moisture-insensitive plastic material. The moisture-insensitive plastic material of the plastic insert 6 is preferably comprised, at least predominantly, of polybutylene terephthalate (PBT) and, in the illustrated embodiment, is a fiberglass-reinforced PBT, in this case PBT-GF30 with 30% proportion of fiberglass. A circumferential wall 13 of the plastic insert 6 is rests areally on the inner side of the passage wall 5 and extends relative to the flow direction indicated by arrow 17 from a location upstream of the mass air flow sensor 4 to a location downstream of the mass air flow sensor 4. The mass air flow sensor 4 is thus positioned relative to the flow direction in an area of the air passage section 3 whose passage wall 5 is completely lined by the circumferential wall 13 of the plastic insert 6. In this area, the inner side of the circumferential wall 13 is configured aerodynamically smooth without abutting seams, edges or the like so that intake air flow, delimited circumferentially by it, is free of turbulence or other disturbances. The flow course within the air passage section 3 is thus predetermined by the enveloping circumferential wall of the plastic insert that encloses the flow cross-section. As a result of the practically negligible water absorption of the moisture-insensitive plastic material selected for the plastic insert 6, the plastic insert 6 is not subjected to dimensional changes caused by moisture absorption so that also the geometric flow course within the air passage section 3 is substantially free of moisture-caused effects. As a result, also the measuring result of the mass air flow sensor 4 is substantially unaffected by the moisture-caused dimensional changes.

Figure 2:
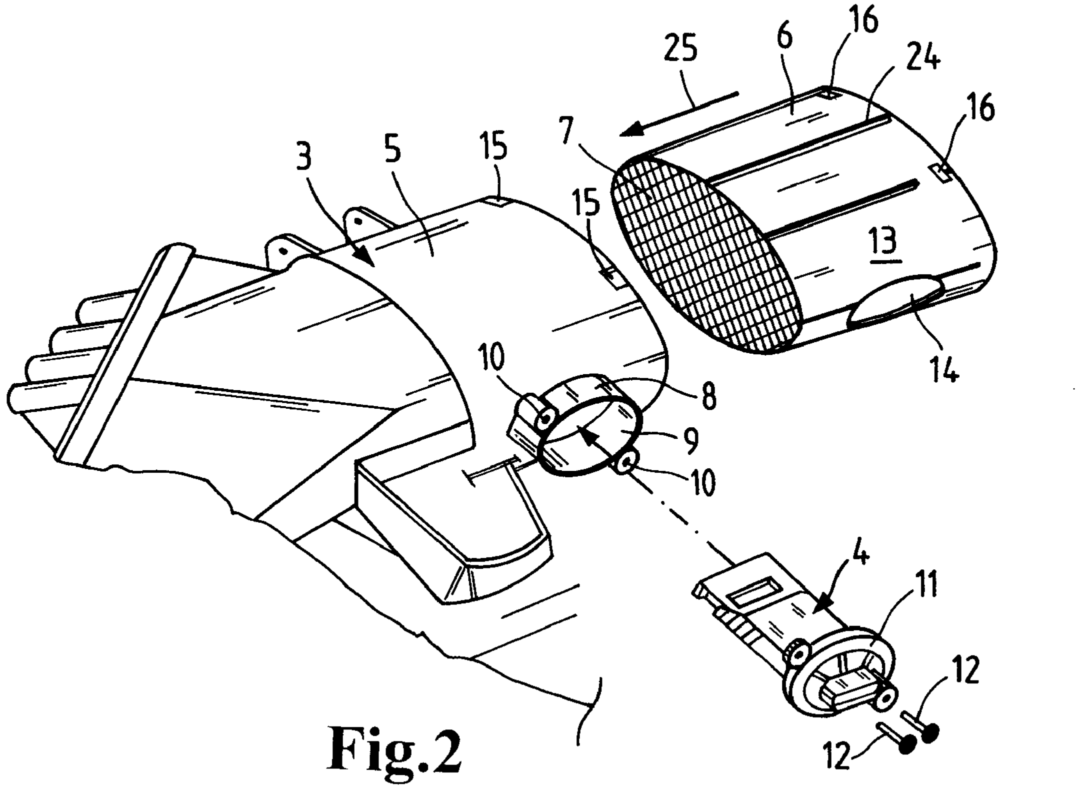
FIG. 2 is a perspective exploded view of the arrangement according to FIG. 1 with details of the plastic insert comprising an air guiding grid and locking noses.

In FIG. 2, in an exploded illustration the arrangement according to FIG. 1 is shown with details in regard to the configuration of the plastic insert 6 and mounting of the mass air flow sensor 4. The plastic insert 6 comprises the circumferential wall 13 surrounding the elliptical flow-cross-section and having at its outer side axially extending grooves 24. On the intake end of the circumferential wall 13 the air guiding grid 7 that covers the free flow cross-section is formed integrally of same material. On the opposite axial end locking noses 16 are formed on the outer side of the circumferential wall 13. Also, the circumferential wall 13 in axial direction is provided centrally with a penetration 14 that is arranged in the area of the semi-major axis of the elliptical cross-sectional contour. The entire component of the plastic insert 6 with the afore described features is injection-molded of the same material as a monolithic part.

For mounting, the plastic insert 6 is inserted or pushed axially in the direction of arrow 25 into the air passage section 3 wherein the ribs 24 facilitate the insertion action and ensure a play-free arrangement of the plastic insert 6 in the air passage section 3. At the correlated free end of the passage wall 5 each locking nose 16 of the plastic insert 6 has a matching locking opening 15 wherein the locking noses 16 upon insertion of the plastic insert 6 snap into place in the locking openings 15 and therefore axially fix the plastic insert 6 in the air passage section 3. An orientation of the plastic insert 6 relative to the air passage section 3 in the rotational direction is predetermined by the elliptical cross-sectional shape of both components. However, a deviating cross-sectional shape may be expedient.

Radially outside in the area of the semi-major axis of the elliptical cross-sectional shape the passage wall 5 of the air passage section 3 is provided with a fastening socket 8 for the mass air flow sensor 4 wherein the fastening socket 8 surrounds an opening 9 penetrating the passage wall 5. In the inserted state of the plastic insert 6 its penetration 14 is aligned with the opening 9. In this state, the mass air flow sensor 4 is inserted radially from the exterior through the opening 9 and the penetration 14 into the free flow cross-section of the air passage section 3 wherein the free end of the mass air flow sensor 4, in accordance with the illustration of FIG. 1, is then positioned approximately centrally within the free flow cross-section. For the fixation of the mass air flow sensor 4 the latter is provided with an outer flange 11 that rests against the end face of the fastening socket 8. An attachment is realized by two screws 12 that are screwed through the flange 11 into the screw receptacles 10 of the fastening socket 8. In the mounted state in accordance with the illustration of FIG. 1 the flange 11 is resting against the outer side of the passage wall 5 and supports thereat a plug-in contact 18 for receiving a plug 19 illustrated in FIGS. 3 and 4 for the electric and measuring-technological connection of the mass air flow sensor 4 to the motor control unit.

Figure 3:
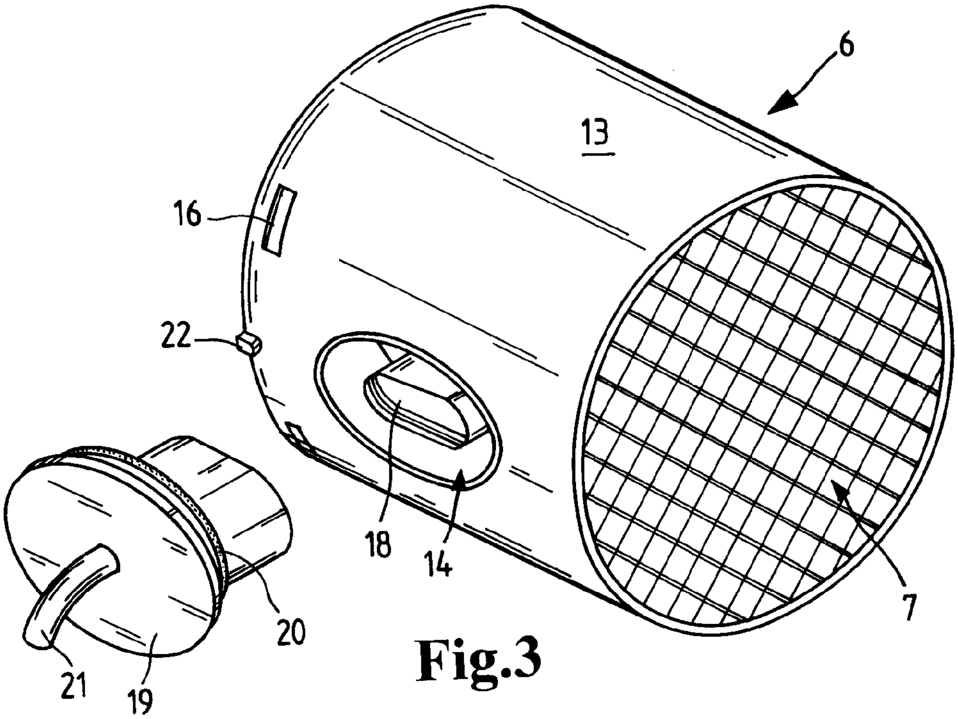
FIG. 3 is a perspective view of a variant of the arrangement according to FIGS. 1 and 2 with mass air flow sensor integrated into the plastic insert.
Figure 4:
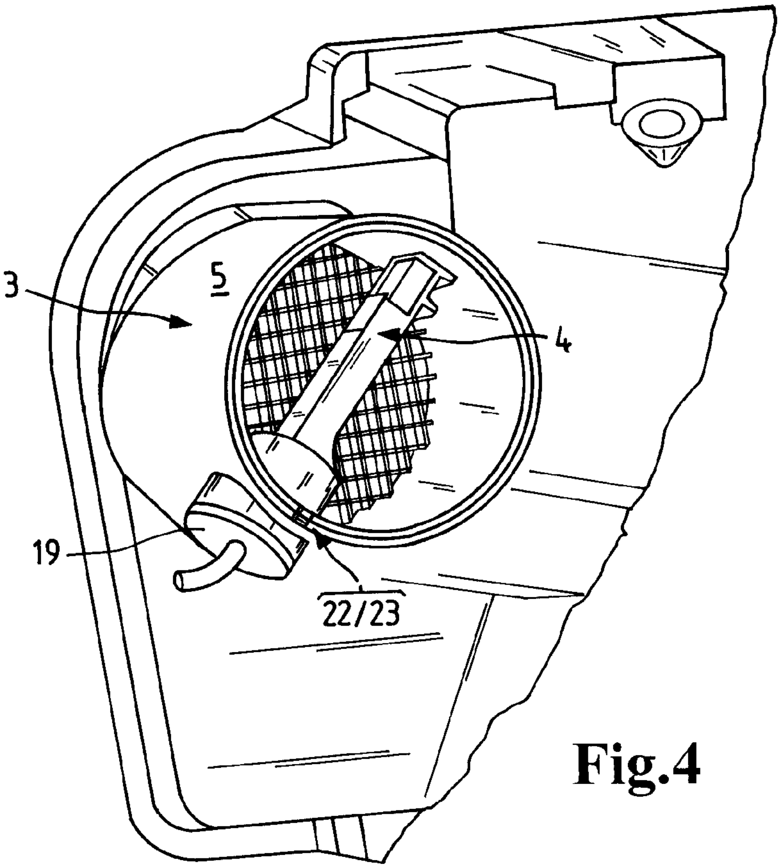
FIG. 4 shows the arrangement according to FIG. 3 in the mounted state.

FIG. 3 shows in a perspective view a variant of the plastic insert 6 according to FIGS. 1 and 2 wherein the plastic insert 6 according to FIG. 3 is illustrated in the mounted state in the perspective illustration of FIG. 4. The arrangement according to FIGS. 3 and 4 matches with regard to its features and reference numerals, if not noted otherwise, that of FIGS. 1 and 2. In FIGS. 3 and 4 it is shown that the free flow cross-section of the air passage section 3 has a circular cross-section so that the passage wall 5 of the air passage section 3 and the circumferential wall 13 of the plastic insert 6 are cylindrical. However, a configuration that narrows, e.g. is conical, in the flow direction can be expedient also. For positionally correct mounting with regard to the rotation direction of the plastic insert 6 the latter is provided on the outer side of the circumferential wall 13 with a nose 22 in addition to the locking noses 16; the nose 22 has correlated therewith a groove 23 in the passage wall 5 (FIG. 4). In the mounted state according to FIG. 4, the nose 22 is resting in the groove 23 so that a rotary angle orientation of the penetration 14 (FIG. 3) with the opening 9, not illustrated in FIG. 4, is realized (comparable to the embodiment of FIG. 2).

When looking at FIGS. 3 and 4, it is apparent that the mass air flow sensor 4, in deviation from the configuration according to FIGS. 1 and 2, is not pushed radially from the exterior through the passage wall 5 but is completely integrated in the plastic insert 6 so as to form an integral component. The penetration 14 in the circumferential wall 13 provides access to the plug-in contact 18 of the mass air flow sensor 4 without the plug-in contact 18 projecting radially past the circumferential wall 13. In this way, the entire unit comprised of the plastic insert 6 and the mass air flow sensor 4 which unit has been calibrated beforehand separately can be inserted axially into the air passage section 3. A plug 19 with cable 21 for electrical and measuring-technological connection of the mass air flow sensor 4 to the motor control unit is passed radially from the exterior through the opening 9 (FIG. 2) and plugged onto the contact 18. A sealing action of the plug 19 relative to the passage wall 5 or the circumferential wall 13 is realized by means of a circumferentially extending sealing ring 20 that is embodied as an O-ring.

In the foregoing specification, specific aspects of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air filter system of a motor vehicle, comprising:

an air filter housing conducting an intake air flow, said air filter housing comprising a housing part of a moisture-sensitive plastic material; and an air passage section having an air flow course within conducting said intake air flow in an air flow direction, said air passage section including a passage wall extending in said air flow direction and circumferentially surrounding said air flow course along said air flow direction wherein said passage wall has an inner side facing said air flow course, wherein said passage wall of said air passage section is integrally formed of identical material on said housing part of said air filter housing;

a mass air flow sensor arranged in said air passage section and operative to measure drawn-in mass air flow of said intake air flow;

a plastic insert of a moisture-insensitive plastic material disposed on said inner side of said passage wall of said air passage section, said plastic insert including an enveloping circumferential wall arranged on said inner side of said passage wall and extending in said air flow direction, said enveloping circumferential wall circumferentially enclosing a flow cross-section through which said air flow course extends, said enveloping circumferential wall extending from a location upstream of said mass air flow sensor to a location downstream of said mass air flow sensor, said enveloping circumferential wall lining said inner side of said passage wall, separating said intake air flow in said plastic insert from said passage wall.

2. The air filter system according to claim 1, wherein said moisture-insensitive plastic material of said plastic insert is comprised at least predominantly of polybutylene terephthalate (PBT).

3. The air filter system according to claim 1, wherein said moisture-insensitive plastic material of said plastic insert is a fiberglass-reinforced polybutylene terephthalate.

4. The air filter system according to claim 3, wherein said moisture-insensitive plastic material is PBT GF30.

5. The air filter system according to claim 1, wherein said moisture-sensitive plastic material of said housing part is at least predominantly comprised of polyamide.

6. The air filter system according to claim 1, wherein said plastic insert is inserted into said air passage section.

7. The air filter system according to claim 6, wherein said plastic insert is locked in said air passage section.

8. The air filter system according to claim 1, further comprising an air guiding grid formed integrally with said plastic insert, wherein said air guiding grid is elongated in said air flow direction and operable to configure said intake air stream for laminar flow upstream of said mass air flow sensor, said laminar flow improving measuring precision of said mass air flow sensor.

9. The air filter system according to claim 1, wherein said plastic insert is an injection-molded part.

10. The air filter system according to claim 1, wherein said mass air flow sensor is integrated into said plastic insert.

11. The air filter system according to claim 8, further comprising:

at least one locking nose formed onto an exterior portion of a circumferential wall of said plastic insert; and at least one locking opening provided in said circumferentially extending passage wall;

wherein said locking noses are aligned and configured to be engageably lockable into said locking openings and operable to axially fix position said plastic insert in said air passage section, wherein said air guiding grid extends axially along a first portion of an axial length of said plastic insert; and wherein in a differing second portion of said plastic insert, said circumferential wall is provisioned such that said mass air flow sensor is extendable therethrough into an interior of said plastic insert.

12. The air filter system according to claim 3, wherein said moisture-insensitive plastic material of said plastic insert is a fiberglass-reinforced polybutylene terephthalate, wherein said plastic insert further comprises an air guiding grid formed integrally with said plastic insert, wherein said plastic insert is substantially unaffected by moisture caused dimensional changes.

13. The air filter system according to claim 12, further comprising:

at least one locking nose formed onto an exterior portion of a circumferential wall of said plastic insert; and at least one locking opening provided in said circumferentially extending passage wall;

wherein said locking noses are aligned and configured to be engageably lockable into said locking openings and operable to axially fix position said plastic insert in said air passage section, wherein said air guiding grid extends axially along a first portion of an axial length of said plastic insert; and wherein in a differing second portion of said plastic insert, said circumferential wall is provisioned such that said mass air flow sensor is extendable therethrough into an interior of said plastic insert.

* * * * *